US012015691B2

(12) United States Patent
Habiba et al.

(10) Patent No.: US 12,015,691 B2
(45) Date of Patent: Jun. 18, 2024

(54) SECURITY AS A SERVICE FOR MACHINE LEARNING

(71) Applicant: International Business Machines Corporation, Armonk, NY (US)

(72) Inventors: Mansura Habiba, Jhonstown (IE); Gokhan Sagirlar, Dublin (IE); Martin Wistuba, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 17/483,051

(22) Filed: Sep. 23, 2021

(65) Prior Publication Data

US 2023/0088588 A1 Mar. 23, 2023

(51) Int. Cl.
| *H04L 29/06* | (2006.01) |
| *G06F 21/55* | (2013.01) |
| *G06N 3/04* | (2023.01) |
| *G06N 3/08* | (2023.01) |
| *H04L 9/00* | (2022.01) |

(52) U.S. Cl.
CPC .............. *H04L 9/008* (2013.01); *G06F 21/55* (2013.01); *G06N 3/04* (2013.01); *G06N 3/08* (2013.01); *G06F 2221/032* (2013.01); *H04L 2209/08* (2013.01)

(58) Field of Classification Search
CPC ..... H04L 9/008; H04L 2209/08; G06F 21/55; G06F 2221/032; G06N 3/04
See application file for complete search history.

(56) References Cited

U.S. PATENT DOCUMENTS

| 9,306,738 | B2 | 4/2016 | Loftus | |
| 10,102,480 | B2 | 10/2018 | Dirac | |
| 10,185,827 | B1 | 1/2019 | Hamlin | |
| 11,669,737 | B2 | 6/2023 | Gupta | |
| 2016/0350648 | A1 | 12/2016 | Gilad-Bachrach | |
| 2019/0318099 | A1* | 10/2019 | Carvalho | .............. G06F 21/577 |
| 2020/0082097 | A1 | 3/2020 | Poliakov | |
| 2020/0293941 | A1* | 9/2020 | Bos | ........................ H04L 9/0869 |
| 2022/0036181 | A1* | 2/2022 | Ott | ...................... G06F 18/2431 |
| 2023/0025754 | A1* | 1/2023 | Hassanzadeh | .......... H04L 9/008 |

FOREIGN PATENT DOCUMENTS

| CN | 101782976 B | 4/2013 |
| JP | 2017524183 A | 8/2017 |

OTHER PUBLICATIONS

Barreno et al., ., "Can Machine learning Be Secure?", ASIACCS'06, Mar. 21-24, 2006, Taipei, Taiwan.
(Continued)

*Primary Examiner* — Jason K Gee
(74) *Attorney, Agent, or Firm* — Stosch Sabo

(57) ABSTRACT

Embodiments are disclosed for a method. The method includes validating training data that is provided for training a machine learning model using ordinary differential equations. The method further includes generating pre-processed training data from the validated training data by generating encrypted training data from the validated training data using homomorphic encryption and generating random noise based on the validated training data. The method also includes training the machine learning model adversarially with the pre-processed training data.

17 Claims, 7 Drawing Sheets

(56) References Cited

OTHER PUBLICATIONS

Chakraborty et al., Adversarial Attacks and Defences: A Survey, arXiv:1810.00069v1, Sep. 28, 2018, 31 pages.
Chen et al., "Neural Ordinary Differential Equations", 32nd Conference on Neural Information Processing Systems (NeurIPS 2018), Dec. 14, 2019, 18 pages.
Chen et al., "Adversarial attack and defense in reinforcement learning-from AI security view" Cybersecurity (2019).
Cheng et al. "AdverQuil: an efficient adversarial detection and alleviation technique for black-box neuromorphic computing systems." Proceedings of the 24th Asia and South Pacific Design Automation Conference. 2019.
Ding et al., "Privacy-preserving Feature Extraction via Adversarial Training", IEEE Transactions on Knowledge and Data Engineering, 2019, 13 pages.
Gilad-Bachrach et al. "Cryptonets: Applying neural networks to encrypted data with high throughput and accuracy." International Conference on Machine Learning. 2016.
Hassan et al. "A Robust Deep Learning Enabled Trust-boundary Protection for Adversarial Industrial IoT Environment." IEEE Internet of Things Journal (2020).
Hesamifard et al., "Privacy-preserving Machine Learning in Cloud", Session: Secure & Privacy Preserving Computations, CCSW'17, Nov. 3, 2017, 6 pages.
Hunt et al., "Chiron: Privacy-preserving Machine Learning as a Service", arXiv:1803.05961v1, Mar. 15, 2018, 15 pages.
Mell et al., "The NIST Definition of Cloud Computing", National Institute of Standards and Technology, Special Publication 800-145, Sep. 2011, 7 pages.
Papernot et al. "Towards the science of security and privacy in machine learning." arXiv preprint arXiv:1611.03814 (2016).
Ryffel et al., "Partially Encrypted Deep Learning using Functional Encryption", Part of Advances in Neural Information Processing Systems 32 (NeurIPS 2019), Abstract Only, 1 page.
Wu et al., "Towards Privacy-Preserving Visual Recognition via Adversarial Training: A Pilot Study", Oct. 22, 2020, 27 pages.
Xu et al., "CryptoNN: Training Neural Networks over Encrypted Data", Apr. 26, 2019, 12 pages.

* cited by examiner

SECURITY AS A SERVICE FOR MACHINE LEARNING

BACKGROUND

The present disclosure relates to security as a service, and more specifically, to security as a service for machine learning.

Deep learning networks, or deep neural networks (DNNs), are a type of artificial neural network with multiple hidden layers between the input and the output layers. DNNs can model complex non-linear relationships and generate compositional models where the object is expressed as a layered composition of primitives. The extra layers enable composition of features from lower layers, potentially modeling complex data with fewer units than a similarly performing, relatively shallower network. In this way, deep learning networks can be useful for solving complex problems, such as language and image processing.

SUMMARY

Embodiments are disclosed for a method. The method includes validating training data that is provided for training a machine learning model using ordinary differential equations. The method further includes generating pre-processed training data from the validated training data by generating encrypted training data from the validated training data using homomorphic encryption and generating random noise based on the validated training data. The method also includes training the machine learning model adversarially with the pre-processed training data.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

As stated previously, deep learning networks can be useful for solving complex problems, such as language and image processing. In order to solve such problems, it can be useful to first train these networks with volumes of training data. However, if the training data is sensitive, e.g., having confidentiality and/or privacy constraints, training can violate these constraints. Violating such constraints can incur civil and/or criminal liabilities through the European General Data Protection Regulation, for example. As such, it can be useful to be able to train a machine learning model in accordance with predetermined statutes, rules, and the like.

Accordingly, some embodiments of the present disclosure can enable training deep learning networks with confidential data while maintaining confidentiality. More specifically, some embodiments of the present disclosure can provide a cloud-based security service that can be invoked to accurately train a machine learning model using sensitive training data securely, privately, and with integrity. Further, some embodiments of the present disclosure can apply privacy enhanced technologies to protect sensitive data. In this way, some embodiments of the present disclosure can improve the operation of deep learning networks by providing a secure end-to-end cloud service for various deep learning tasks, ensuring data validation prior to training, and provide data security and transparency for both a cloud provider of the deep learning network and the customer that is training the deep learning network. Additionally, some embodiments of the present disclosure can improve security for artificial intelligence system development, and advanced cryptography.

Figure 1:
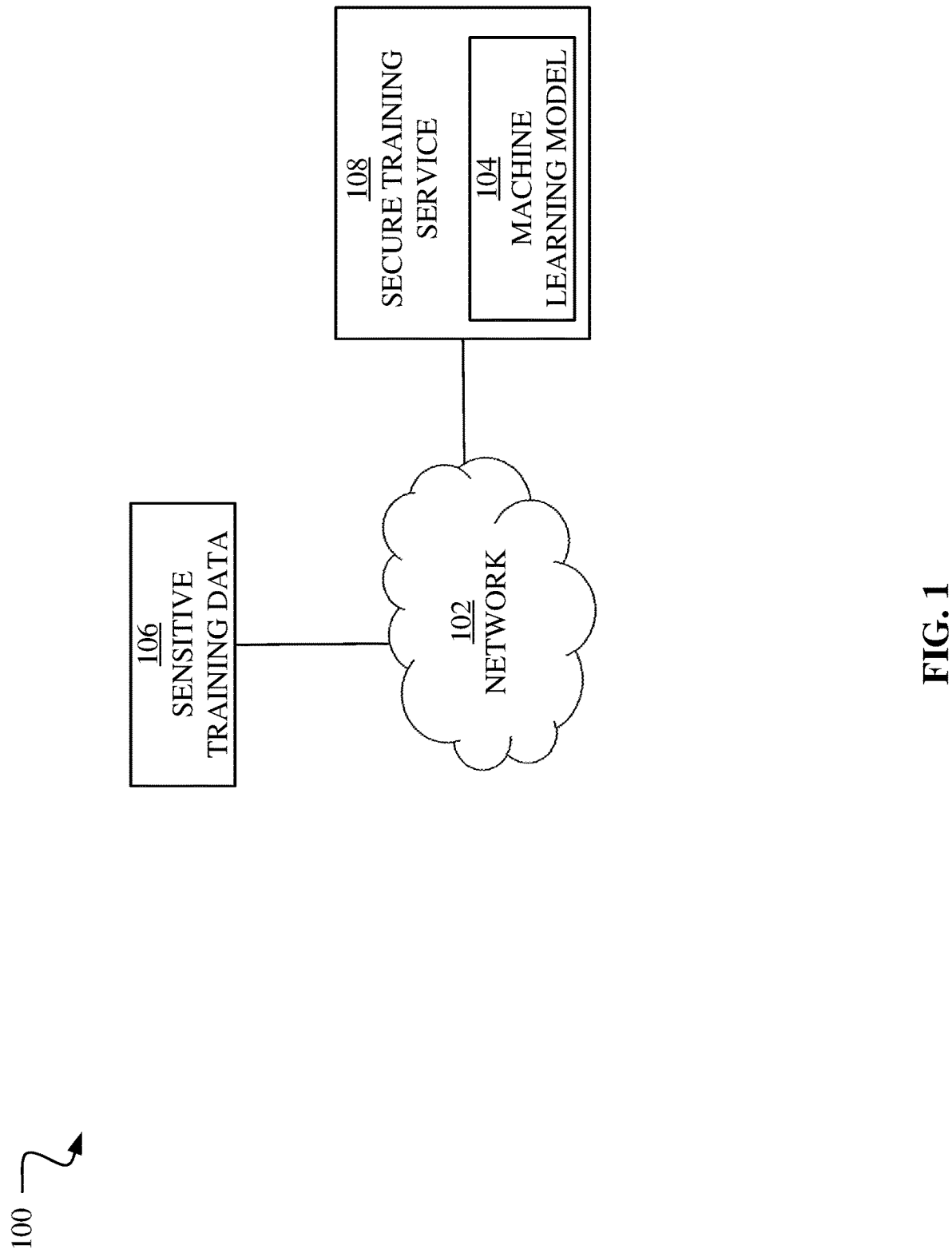
FIG. 1 is a block diagram of an example system for security as a service for deep learning, in accordance with some embodiments of the present disclosure.

FIG. 1 is a block diagram of an example system 100 for security as a service for deep learning, in accordance with some embodiments of the present disclosure. The system 100 includes a network 102, machine learning model 104, sensitive training data 106, and secure training service 108. The network 102 may be a local area network, wide area network, or collection of computer communication networks that facilitates communication between components of the system 100, specifically, between the machine learning model 104, sensitive training data 106, and secure training service 108. In some embodiments, the network 102 can be the Internet.

Machine learning is a form of artificial intelligence that enables a system to learn from data rather than through explicit programming. Accordingly, the machine learning model 104 can be an algorithm trained to make a particular classification, or prediction. The machine learning model 104 trains on a training set, such as the sensitive training data 106. The sensitive training data 106 can include batches of records that the machine learning model 104 attempts to classify. Additionally, the sensitive training data 106 can include labels that indicate the correct classifications. In this way, the machine learning model 104 can determine when classifications are correct and try to learn, i.e., improve, the classification. Further, the sensitive training data 106 can occupy relatively large amounts of storage. Accordingly, a service provider may provide cloud storage as a service for temporary storage of the sensitive training data 106.

One type of machine learning model is a deep neural network. Deep neural networks can resemble biological neural networks, and as such, include layers of artificial neurons interconnected by plastic synapses. The neurons can act as parallel processing units that tune weights of the interconnections. In this way, the machine learning model 104 can solve certain problems, such as classification problems, efficiently.

The machine learning model 104 can involve relatively large amounts of computing resources. As such, it may not be practical for data scientists, or other users, trying to create machine learning models for their classification problems to build their own deep neural networks. Accordingly, a cloud provider can provide the machine learning model 104 as a service, meaning that a data scientist can purchase use of the machine learning model 104 in order to generate their own models to solve their specific classification problems.

As stated previously, machine learning models 104, such as, deep neural networks can learn to solve classification problems through training. However, training can involve revealing the training data to the machine learning model 104, which can compromise the sensitive nature of the sensitive training data 106. Accordingly, in some embodiments of the present disclosure, the secure training service 108 can provide an end-to-end service to train machine and deep learning models using sensitive training data 106 without revealing the raw and/or sensitive data to the service provider. In some embodiments of the present disclosure, a customer of the service provider can invoke the secure training service 108 using a cloud function, representational state transfer application program interface (REST API), and the like. Further, the secure training service 108 can provide adversarial training of deep learning on sensitive training data that may be encrypted, thus providing more robust models. Adversarial training can be useful to address the challenge of malicious actors poisoning (contaminating, manipulating, and the like) training data. Because the machine learning model 104 is trained using data sets that are assumed to be representative and valid for the subject matter in question, malicious actors can impact how the artificial intelligence system functions by poisoning the training data. Adversarial training can thus involve identifying poisoned training data to mitigate their impact on the machine learning model's predictions.

Also, the secure training service 108 can perform data validation to improve the quality of input training data, e.g., the sensitive training data 106, and output results. Further, the secure training service can apply advanced cryptographic techniques to protect privacy of the sensitive training data 106. In addition to data encryption, the secure training service 108 can generate encrypted noise for adversarial training. Additionally, the secure training service 108 can apply encryption-aware adversarial example generation in order to train encrypted data. The secure training service 108 can also enable confidential learning and query execution on encrypted data through homomorphic encryption protocols. The query execution may take place on a database that holds the encrypted data. For example, the sensitive training data 106 may be stored in some database (or datastore), and encrypted with homomorphic encryption. Further, the encrypted training data may yet move, for example, to be stored in another database. Homomorphic encryption protocols can enable the secure training service 108 to train the machine learning model 104 without decrypting sensitive training data 106. Further, in some embodiments of the present disclosure, the secure training service 108 can protect the sensitive training data 106 by using a cryptographic toolset, such as private key infrastructure (PKI), secure data communication, integration tools, and the like.

Figure 2:
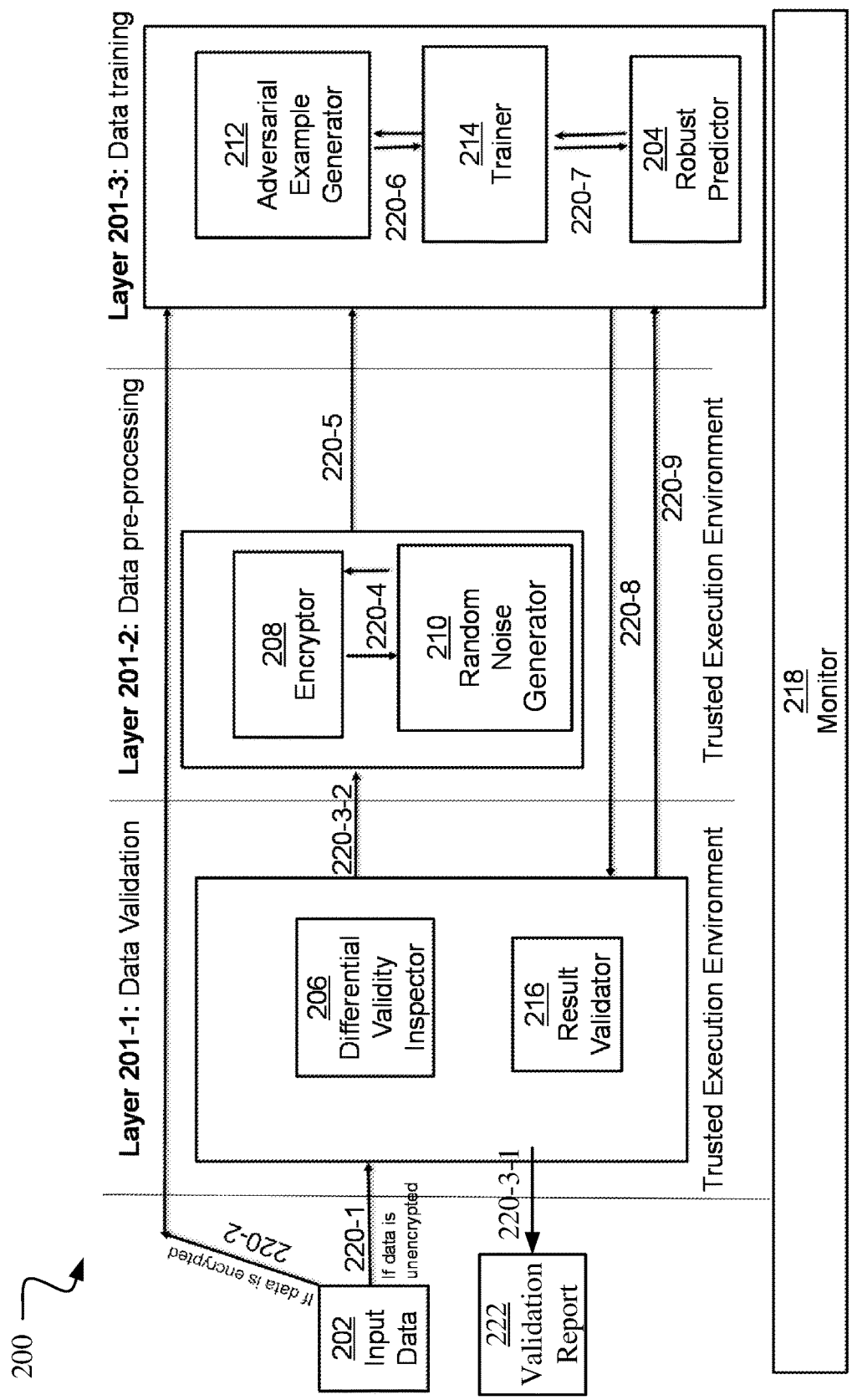
FIG. 2 is an example system for a secure training service, in accordance with some embodiments of the present disclosure.

FIG. 2 is an example system 200 for a secure training service, in accordance with some embodiments of the present disclosure. The example system 200 is similar to the system 100 described with respect to FIG. 1. More specifically, the example system 200 includes three layers: data validation layer 201-1, data pre-processing layer 201-2, and data training layer 201-3 (collectively referred to as layer(s) 201) The example system 200 further includes input data 202, and a monitor 218. The layers 201 may represent the secure training service 108, described with respect to FIG. 1. The data validation layer 201-1 and data pre-processing layer 201-2 may run on trusted execution environment hardware. Further, the data validation layer 201-1 and data pre-processing layer 201-2 can be provided as an application programming interface (API) or services that the client may access using an access token. In this way, the client may process their on-site data using the secure training service 108 as a cloud service and instructions, i.e., operations or actions. In some embodiments of the present disclosure, the client can choose to have private (non-shared) data validation layer 201-1 and data pre-processing layer 201-2. Thus, a separate management team and customer team can co-create on the modules in these two layers. Co-creating in this context is about configuring how data is stored and processed in the cloud premises.

Additionally, the input data 202 may be similar to the sensitive training data 106, and can be input to the data validation layer 201-1 or data training layer 201-3. The layers 201 include a robust predictor 204, differential validity inspector 206, encryptor 208, random noise generator 210, adversarial example generator 212, trainer 214, and result validator 216.

Additionally, a client of the service provider can provide the input data 202 for secure training on a machine learning model. The input data 202 can be similar to the sensitive training data 106. Further, the input data 202 can be an input data source described in a uniform resource locator and/or file, which may be encrypted or unencrypted. Additionally, a client of the secure training service 108 can identify a selection of machine learning algorithm and/or hyperparameters. In response, the example system 200 can provide a robust predictor 204, which can represent a trained, robust machine learning model for encrypted data. Further, the learning for the robust predictor 204 can be continuous, wherein the client can provide feedback to validate the generated result, e.g., the robust predictor 204. In some embodiments of the present disclosure, the client can provide feedback regarding the accuracy of the robust predictor 204 as part of the payment for the secure training service 108.

In some embodiments of the present disclosure, the example system 200 includes the three layers 201 in an application stack. More specifically, the data validation layer 201-1 can perform differential validity inspection and result validation. Further, the data pre-processing layer 201-2 can apply advanced cryptography techniques to protect sensitive data, e.g., the input data 202, and prepares the input data 202 for adversarial training. Additionally, the data training layer 201-3 can perform adversarial training with various machine learning algorithms to obtain robust models, such as the robust predictor 204.

The lines 220-1 through 220-7 (collectively referred to as lines 220) can represent a process for a sensitive training service, according to some embodiments of the present disclosure. For example, lines 220-1, 220-2 can represent alternative inputs of the input data 202 to one of the layers 201. As stated previously, malicious actors can poison the input data 202. Thus, it may be useful to validate the input data 202 to protect the robust predictor 204 from contaminated or manipulated data. However, verifying encrypted data can be challenging. Thus, if the input data 202 is encrypted, line 220-2 represents the input of encrypted input data to the data training layer 201-3. The data training layer 201-3 is described in greater detail below. With respect to data validation though, input data 202 that is not encrypted can be input to the data validation layer 201-1. Accordingly, the data validation layer 201-1 can validate and clean the input data 202 based on the client's requirements. For example, the data validation layer 201-1 may determine if a malicious user is manipulating the continuous stream of input data 202. If so, the data validation layer 201-1 can identify the manipulated data and notify the data owner. Further, the data validation layer 201-1 can also reject invalid batches of the input data 202 to prevent invalid data from being used in training.

The line 220-3-1 represents the data validation layer 201-1 providing a validation report 222 that identifies invalid data. The line 220-3-2 represents the data validation layer 201-1 providing the validated data for the data pre-processing layer 201-2. More specifically, the data validation layer 201-1 may share the validated data securely with the pre-processing layer 201-2 through a PKI key.

The pre-processing layer 201-2 includes the encryptor 208 and random noise generator 210. Accordingly, the lines 220-4 represent the exchange of validated, encrypted, and/or intentionally noisy data between the encryptor 208 and the random noise generator 210 of the pre-processing layer. Further, the line 220-5 represents the pre-processing layer 201-2 providing the pre-processed data for the data training layer 201-3. More specifically, the pre-processing layer 201-2 may share the encrypted and/or noisy data with the data training layer 201-3 using a PKI key. The line 220-6 represents exchanges of examples and training data between the adversarial example generator 212 and the trainer 214. Similarly, the line 220-7 represents exchanges of training data between the trainer 214 and the robust predictor 204. The line 220-8 represents the exchange of the final output of the model (e.g., robust predictor 204) to the result validator 216 to query feedback. Additionally, the line 220-9 represents the exchange of feedback from result validator 216 for the model to improve the efficiency of the model. The layers 201-1, 201-2 may operate in one or more trusted execution environments, and are described in greater detail below. In this way, the system 200 may provide a client of the secure training service a trained and secure robust predictor 204.

The data validation layer 201-1 includes the differential validity inspector 206 and result validator 216. The result validator 216 can validate trained data output from the data training layer 201-3. Accordingly, the result validator 216 is described in greater detail below with respect to data training layer 201-3.

In contrast to the result validator 216 processing output, the differential validity inspector 206 can process input, more specifically, the input data 202. The differential validity inspector 206 can reject input data 202 that is invalid (e.g., poisoned data). Further, because the input data 202 can be continuous, the differential validity inspector 206 can follow changes in the input data 202 over continuous time (batch and/or stream) to determine if the data is contaminated or manipulated. More specifically, the differential validity inspector 206 can determine the differences in continuous incoming data and maintain a pre-defined threshold value (e.g., a) to determine the difference (e.g., dy/dt) between incoming data and a predetermined benchmark data from a same data source. If the differential validity inspector 206 determines the difference (dy/dt) is more than a predetermined threshold, a, the differential validity inspector 206 can flag the data as potential contamination. For example, the secure training service 108 (e.g., data validation layer 201-1) can receive each row of the input data 202 at different points in time (e.g., timeframes). Thus, consecutive rows of the input data 202 may arrive at consecutive timeframes. Accordingly, the differential validity inspector 206 can determine the difference (e.g., a spatial difference) between these rows received at these timeframes. Assuming the source of the input data 202 is known, if the difference between two consecutive timeframes of the input data 202 is less than or equal to the spatial realm, then the rows may be valid. The spatial realm may refer to a predetermined threshold value representing a spatial difference between two consecutive rows of input data, where each row of input data is represented at a point in multi-dimensional space. When the difference falls within the spatial realm, the rows may be similar, and not likely poisoned. However, if the difference exceeds the spatial realm, one of the rows may be poisoned. Poisoned data can diminish the reward incentive. Accordingly, the differential validity inspector 206 may reject the potentially poisoned row.

In some embodiments of the present disclosure, the differential validity inspector 206 can generate a validation report 222 that identifies input data 202 that the differential validity inspector 206 flags as invalid, contaminated, poisoned, and the like.

In some embodiments, the differential validity inspector 206 can use a neural ordinary differential equation (ODE) based neural network that determines changes in incoming data as described above. Such a network can use inputs such as, time (t), final time (T), current observation at time t (y(t)), threshold($\alpha$), a neural ODE-based neural network (f), and an average benchmark observation for a same (and/or similar) source (Z). Using such inputs, the neural ODE-based network, f, can provide a flag identifying whether y(t) is valid or invalid data. EXAMPLE PROCEDURE 1 provides an example for a DVI, such as the differential validity inspector 206, to flag invalid data:

Procedure(t, y(t), f, Z, T):

$z(t)=Z[t]$

If $>\alpha$:
//{Potential noise or spike in the data}
  Return invalid=true
Else
  Continue.

Example Procedure 1

In the EXAMPLE PROCEDURE 1, the function Z(t) can represent the benchmark observation at time t (the t-th observation from the benchmark data series). Accordingly, the differential validity inspector 206 can use a function, ODEsolver, to determine the difference d/dt (y), using network f, current observation y(t), time t, final time T, and benchmark observations z(0) and z(t). The final time T can represent the end of a predetermined time range with respect to t. In this way, the differential validity inspector 206 can determine the difference between the input data 202 with respect to average benchmark data at a same time t. If the difference d/dt (y) is greater than threshold, then y(t) may represent potential noise or a spike in the data. Accordingly, the differential validity inspector 206 can return a value indicating the invalid status is true, i.e., the observation y(t) is invalid. Alternatively, if the difference d/dt (y) is not greater than the threshold, EXAMPLE PROCEDURE 1 may continue processing for another observation.

The pre-processing layer 201-2 includes the encryptor 208 and random noise generator 210. The pre-processing layer 201-2 can meet customer requirements to protect highly sensitive data such as, health care and business-critical data. In these contexts, protection can mean hiding the data from cloud and/or service providers, including the secure training service provider. Thus, by pre-processing the validated data, the pre-processing layer 201-2 can protect the clients' privacy by training a machine learning algorithm, such as the robust predictor 204, on encrypted data. Accordingly, the encryptor 208 can encrypt the validated data using homomorphic encryption. Homomorphic encryption makes it possible to cryptographically secure raw data, input the homomorphically encrypted data into a machine learning model. Further, even though training on the encrypted data, the machine learning model may provide a trained predictor that is generally equivalent to the predictor generated by training on the raw data. In some embodiments of the present disclosure, the pre-processing layer 201-2 may provide the encrypted data to the data training layer 201-3. Alternatively, the encryptor 208 can provide encrypted data for the random noise generator 210.

The random noise generator 210 can be useful for adding noise to the validated and/or encrypted data to mitigate potential adversarial attacks on the machine learning model. More specifically, the model is trained on data with additional (intentionally introduced) noise, which the random noise generator 210 can generate. However, instead of plain noise, the random noise generator 210 can additionally use homomorphic encryption to generate encrypted noise. In order to destroy potential adversarial noise added to the input and not filtered by the data validation layer 201-2, the random noise generator 210 may add random noise to the validated, encrypted data. The data training layer 201-3 may not have the ability to encrypt data. As such, the data training layer 201-3 may not be able to encrypt the noise. Accordingly, the pre-processing layer 201-2 may generate, encrypt, and provide a relatively large but finite set of noise tensors for the data training layer 201-3.

As stated previously, if the input data 202 is encrypted the input data 202 can be input to the data training layer 201-3. However, in some embodiments of the present disclosure, the data training layer 201-3 can operate on the assumption that the encrypted input data 202 follows the protocol configurations provided by the data validation layer 201-1 and pre-processing layer 201-2. More specifically, the client may validate the input data 202, e.g., cleaning, according to the protocols described with respect to the differential validity inspector 206. These protocols may be shared with the client as protocol configurations. Further, the client may perform homomorphic encryption on the input data 202 according to the encryption protocol defined and/or used by the encryptor 208. The encryption protocol may also be shared with the client as protocol configurations. Additionally, the client may generate random noise in the input data 202, thus replacing the operation performed by the random noise generator 210.

The data training layer 201-3 includes an adversarial example generator 212, trainer 214, and robust predictor 204. The traditional adversarial example generator may not be useful for a secure training service because the training data itself is encrypted. Accordingly, in some embodiments of the present disclosure, the adversarial example generator 212 can generate adversarial examples that are aware of the data encryption mechanism. More specifically, the adversarial example generator 212 can take as input the current robust predictor and a batch of encrypted data. Additionally, the adversarial example generator 212 can alter the encrypted data adversarially. Altering the data in this way means that the alteration, e.g., perturbation, results in the model making a different prediction than made for the unaltered data. This perturbation of the encrypted data can be relatively small. In some embodiments of the present disclosure, the adversarial example generator 212 can generate adversarial examples for the current robust predictor 204. In this way, the trainer 214 can use such examples on-the-fly to harden the robust predictor 204.

The trainer 214 can be a machine learning algorithm based on the requirements of the client. Examples of trainers 214 can perform natural language and image processing, for example. The trainer 214 can be capable of training on homomorphically encrypted data. The trainer 214 can train a deep learning model on the encrypted data. Further, the trainer 214 can apply encrypted random noise to the encrypted training data at random to destroy potential adversarial noise. To obtain a model that is robust against adversarial attacks, the trainer 214 can apply adversarial training.

The robust predictor 204 can be the model generated from the validated, pre-processed, and adversarially noisy training data. According to some embodiments of the present disclosure, the robust predictor 204 can be robust against adversarial attacks and capable of making predictions for encrypted data. Additionally, the robust predictor 204 can apply defensive mechanisms against adversarial attacks to the input (e.g., adding random noise). Some embodiments of the present disclosure apply noise during two different processes: training and inference. During training, the trainer 214 may train the model with adversarial noise and Gaussian noise. With respect to adversarial noise, the adversarial example generator 212 generates adversarial noise, which make the robust predictor 204 robust against adversarial attacks. With respect to Gaussian noise, the random noise generator 210 can generate the Gaussian noise, which can make the robust predictor 204 robust against noisy data. At inference time, the random noise generator 210 may add Gaussian noise to the input data. Since the model, e.g., the robust predictor 204 has been trained with Gaussian noise, the robust predictor 204 has the ability to mitigate the effects of the Gaussian noise. Further, when a malicious actor alters the input data to attack the model, the robust predictor 204 may weaken or destroy the malicious act completely as a result of the adversarial training.

As stated previously, the data training layer 201-3 can provide training results for the data validation layer 201-1, which includes the result validator 216. The result validator 216 can perform a quality check on the predictions from the robust predictor 204. The quality check may be based on expectations of the training model results, accuracy, and the like. In this way, the result validator 216 (or, the client [manually]) checks, in accordance to the client requirements, if the robust predictor 204 satisfies these requirements.

The result validator 216 can also accept input feedback from the client in order to improve the robust predictor 204. More specifically, the result validator 216 can continuously accept a reward as input from the client of the secure training service 108. Alternatively, the result validator 216 can generate the reward from a predefined function that evaluates the result of the robust predictor 204. The reward can be useful for reinforcement learning. Reinforcement learning may refer to the technique of providing a reward for correct predictions, i.e., accuracy. With reinforcement learning, the result validator 216 can reinforce the robust predictor's learning by providing a statistical reward for accuracy. In this way, the result validator 216 can help update the model to improve its efficiency. Additionally, if the input data 202 is raw data (e.g., not encrypted), the result validator 216 can validate the robust predictor 204. Alternatively, if the input data 202 is encrypted, the client may validate the robust predictor 204. The result validator 216 may also accept feedback from the client in order to improve the robust predictor 204.

The monitor 218 can be a user interface for the client of the secure training service. Although the monitor 218 has no access to encryption or the machine learning algorithm of the trainer 214, the monitor 218 may visually represent the flow of the input, validated, pre-processed, and trained data through the system 200. In this way, the monitor 218 may provide a trace of the activity performed on the input data 202. Additionally, the monitor 218 can provide information regarding data quality, training performance, accuracy, robustness metrics and others related parameters of the system 200. By enabling the client to view this tracing, the monitor 218 can encourage the client to have more trust in the security of the secure training service.

As stated previously, the differential validity inspector 206 can use ordinary differential equations to determine the difference between consecutive rows in the training data. Ordinary differential equations represent how a vector, A, changes over time, t, as represented in EQUATION 1:

$$dA/dt = f(A(t), t) \quad \text{EQUATION 1}$$

In EQUATION 1, f is an initial value problem function, as expressed in EQUATION 2:

$$A(t_n) = A(t_0) + \int_{t_0}^{t_n} f(A(t), t, \theta) dt \quad \text{EQUATION 2}$$

The Euler solution for initial value problem is represented in EQUATION 3:

$$A(t+h) = A(t) + hf(Z, t) \quad \text{EQUATION 3}$$

Accordingly, the differential validity inspector 206 could use a neural network for an ODE solver. The continuous dynamics of the hidden units of encrypted data can be parameterized using an ordinary differential equation (ODE), where f is a neural network layer parameterized at layer t. Training such an ODE neural network may involve an adjoint state. The adjoint state a(t), shown in EQUATION 4 can represent how the loss depends on the hidden state at any time t.

$$a(t) = \frac{dL}{dz(t)} \quad \text{EQUATION 4}$$

Additionally, the time derivative and/or the dynamics of adjoint can be represented in EQUATION 5:

$$\frac{\partial a(t)}{\partial t} = a(t) \frac{\partial f(z_t, t, \theta)}{\partial z} \quad \text{EQUATION 5}$$

Further, the solution of the adjoint state as an integral can be represented in EQUATION 6:

$$\frac{dL}{dz(t)} = a(t_0) = \int_{t_1}^{t_0} -a(t) \frac{\partial f(z_t, t, \theta)}{\partial z} dt \quad \text{EQUATION 6}$$

Instead of backpropagating through the operations of the ODESolver, the ODE neural network may compute the a(t) using automatic differentiations. Accordingly, the ODE neural network may solve the original ODE and the accumulated gradients backwards through time using a loss function. Further, the ODE neural network may compute the gradient of the free parameters using ODE solver. Additionally, embodiments of the present disclosure may analyze for adjoint sensitivities to prevent additional memory costs.

Figure 3:
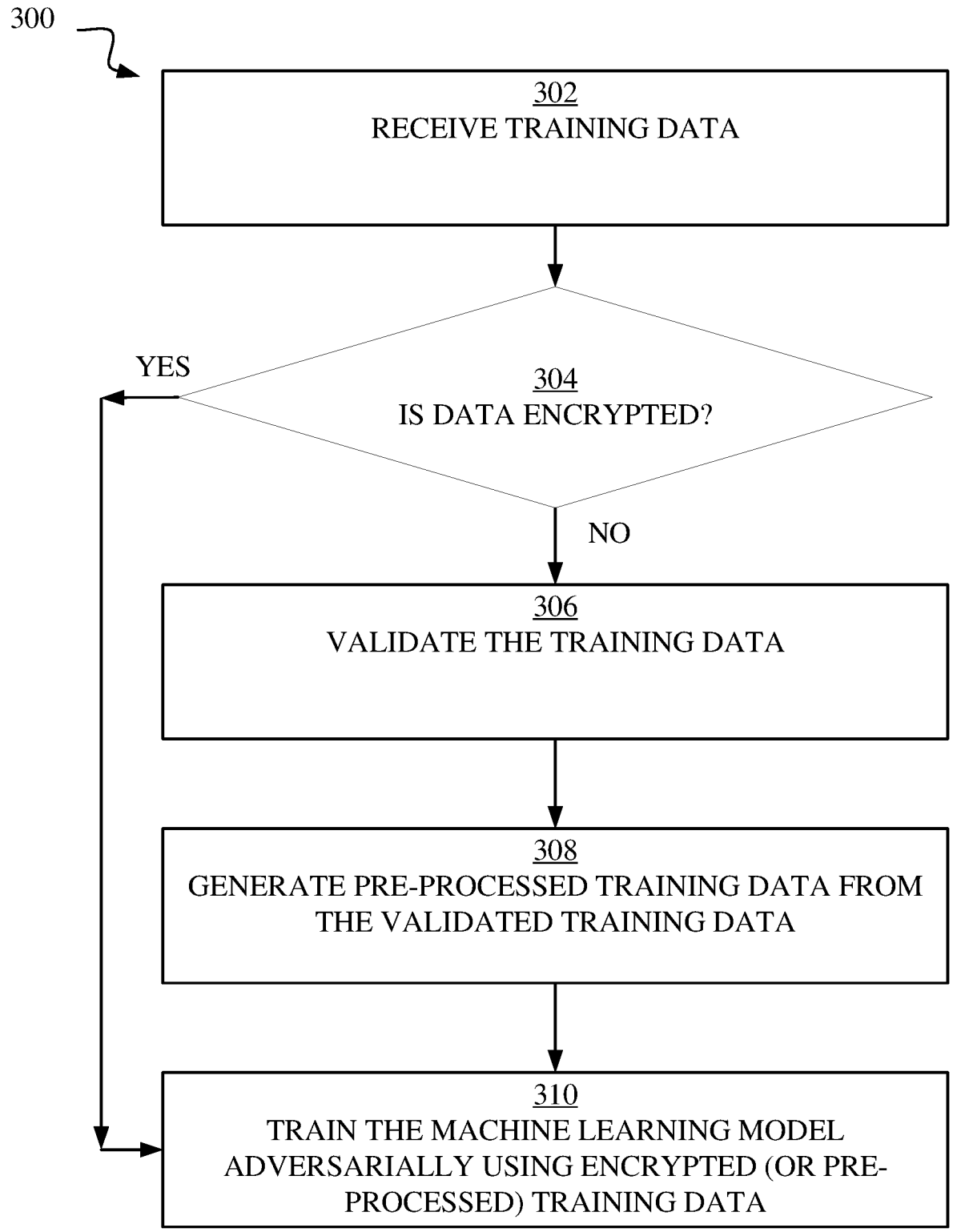
FIG. 3 is a process flow diagram of an example method for a secure training service, in accordance with some embodiments of the present disclosure.

FIG. 3 is a process flow diagram of an example method 300 for a secure training service, in accordance with some embodiments of the present disclosure. The secure training service 108, described with respect to FIG. 1, and the system 200 can perform the example method 300 in accordance with some embodiments of the present disclosure.

At operation 302, the secure training service 108 can receive training data, such as the input data 202. As stated previously, a client of the secure training service provider may submit the input data 202 in either encrypted or unencrypted form.

At operation 304, the secure training service 108 can determine if the training data is encrypted. If the training data, e.g., input data 202 is encrypted, the method 300 continues at operation 310. If the training data is not encrypted, the method 300 continues to operation 306.

At operation 306, the secure training service 108 can validate the training data. As stated previously, validating the training data can involve using ordinary differential equations to identify potentially poisoned training data. Ordinary differential equations can help identify potentially poisoned training data by taking advantage of the fact that a vector representing the training data can change over time. Vector A changes over time, t. Thus, if a function, f(A(t), t) is an initial value problem function, then the differential off can be represented as shown in EQUATION 7:

$$\frac{dA}{dt} = f(A(t), t) \quad \text{EQUATION 7}$$

Further, A(t) can be represented as shown in EQUATION 8:

$$A(t_n) = A(t_0) + \int_{t_0}^{t_n} f(A(t), t, \theta) dt \quad \text{EQUATION 8}$$

Additionally, the Euler solution for the initial value problem can be represented as shown in EQUATION 9:

$$A(t+h) = A(t) + hf(Z, t) \quad \text{EQUATION 9}$$

At operation 308, the secure training service 108 can generate pre-processed training data from the training data for a machine learning model, such as the machine learning model 104. As stated previously, if a client submits input data 106 having unencrypted and/or raw data, the data validation layer 201-1 can generate validated input data for the pre-processing layer 201-1, which can homomorphically encrypt the validated input data, and add random noise. Generating the pre-processed training data is described in greater detail with respect to FIG. 4.

At operation 310, the secure training service 108 can train the machine learning model adversarially using encrypted (or pre-processed) training data. As stated previously, the trainer 214 can train a deep learning model on the encrypted data. In addition to the validated data, the trainer 214 can apply the encrypted random noise to the encrypted training data at random to mitigate potential adversarial noise.

Further, to obtain a model (e.g., robust predictor 204) that is robust against adversarial attacks, the trainer 214 can apply adversarial training. More specifically, the adversarial example generator 212 can generate adversarial examples for the current model (e.g., the robust predictor 204 at its current level of training). Adversarial examples are model dependent. Thus, when the model changes, the adversarial examples change. The adversarial example generator can compute an adversarial example by taking the training data and altering the training data (e.g., by epsilon) in such a way that the model makes wrong predictions. Accordingly, the trainer 214 may use the examples on-the-fly to harden the model, thus generating a robust deep learning model that uses encrypted data for training by the trainer 214. On-the-fly means that the adversarial example generator 212 is constantly recomputing the adversarial examples based on the constantly changing model. For example, once the adversarial example generator 212 has generated the adversarial examples, the robust predictor 204 (e.g., R) can use domain specific metadata from the validated, pre-processed training data to choose the right label, y, from a predetermined set: L∈{1, . . . , k}. The selected label can be represented as EQUATION 10:

$$y = f(x+N) \quad \text{EQUATION 10}$$

In EQUATION 10, f can be a neural network, and N the minimum amount of noise required to disassociate the training data from its true label. Further, R can also learn N over time and control the noise level of the trainer 214 to avoid the disassociation. Additionally, R can learn the disassociation degree of the validated, pre-processed training data as the output of the adversarial example generator 212. For example, here M can be the likelihood that the training data has been manipulated or disassociated from its true label, and g can be a native Bayes Gaussian likelihood. The disassociation degree can be represented as EQUATION 11:

$$\log(M(x)) = \sum_{i=1}^{n} g(x_i | \text{feature} = z, \text{class} = c) \quad \text{EQUATION 11}$$

According to some embodiments of the present disclosure, R and the differential validity inspector 206, V, can be closely related, after the training result evaluation by R, R can communicate with V with a notification that the training data record is either malicious or valid. Further, R can also use a predefined threat model to predict any potential attack.

Figure 4:
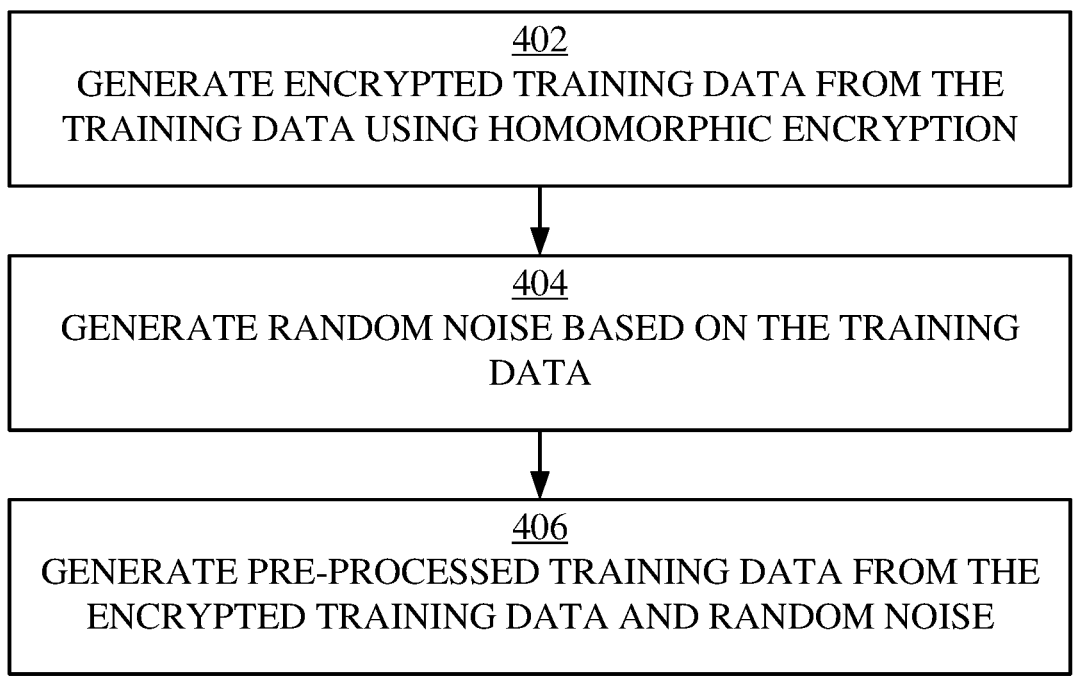
FIG. 4 is a process flow diagram of an example method for generating pre-processed training data, in accordance with some embodiments of the present disclosure.

FIG. 4 is a process flow diagram of an example method 400 for generating pre-processed training data, in accordance with some embodiments of the present disclosure. The example method 400 may be a sub-method of operation 308, described with respect to FIG. 3. The secure training service 108, encryptor 208 and random noise generator 210 can perform the example method 400.

At operation 402, the encryptor 208 may generate encrypted training data from the training data using homomorphic encryption. As stated previously, the encryptor 208 may perform homomorphic encryption on the validated training data.

At operation 404, the random noise generator 210 generates random noise in the validated input data. This random noise is also encrypted.

At operation 406, the encryptor 208 and the random noise generator 210 may generate the pre-processed training data from the encrypted training data and the random noise. Accordingly, the trainer 214 may train the robust predictor 204 using the pre-processed training data, which the trainer 214 may access through a PKI.

The following describes an example scenario for using example methods 300 and 400. A client of the secure training service 108 may have access to a dataset containing sensitive health care records. These records may be useful for training deep neural network. As such, the client may use the secure training service 108 to develop a robust predictor without compromising the sensitivity of the health care records in a way that either the service provider, or the client, manages.

If the service provider manages, the client may upload the raw, unencrypted health care records to a specific location (e.g., a uniform resource locator). Accordingly, the service provider may perform the differential validation and pre-processing as described above. Additionally, the service provider may provide the validation report 222 for the client. Further, the service provider may adversarially train the robust predictor 204 using the validated, pre-processed training data. Accordingly, the service provider may provide the robust predictor 204 for the client.

If the client manages, the client may perform the data validation in accordance with the techniques described with respect to the differential validity inspector 206. Further, the client may apply homomorphic encryption to the training data, in accordance with the techniques described with respect to the encryptor 208. The client may thus provide the validated and encrypted data to the service provider, who may train the robust predictor 204 using the validated and encrypted data.

Accordingly, some embodiments of the present disclosure may provide a privacy-protective security as a service for cloud based machine learning tasks. Further, some embodiments of the present disclosure can use a three-layered approach to provide end-to-end adversarial training of deep learning on encrypted data to obtain robust models and data validation. Also, some embodiments of the present disclosure are capable of protecting sensitive data with cryptography techniques, including but not limited to, homomorphic encryption. Additionally, some embodiments of the present disclosure can help ensure quality of service through pre-defined and agreed contracts on the quality metrics, such as; model performance (e.g. classification accuracy), model robustness (e.g. classification accuracy under attack), privacy protection guarantees, and the like.

Advantageously, the adversarial training and other defensive protocols of the techniques described herein can help secure the robust predictor 204 against adversarial attacks. Additionally, some embodiments of the present disclosure can mitigate non-adaptive black-box attacks. Non-adaptive black-box attacks may use a model similar to the model being attacked. However, because some embodiments of the present disclosure may use encryption using a private key, for example, such malicious actors may not be able to train a similar model without the private key. Further, some embodiments of the present disclosure enable the secure use of sensitive data in machine learning with encryption. Also, some embodiments of the present disclosure, can validate training data to help prevent training the robust predictor 204 with poisoned data. Additionally, some embodiments of the present disclosure can help prevent logic corruption as the model (training data, model design, model validation) is not accessible by a third party or a customer. The model is not accessible because the service provider does not disclose the architecture of the model to any party including customers and other stakeholders. As the model architecture is hidden, manipulating model training can be difficult. Thus, the customer only needs their classification or prediction problem solved for their data. The customer does not need to know the complex architecture of model. A third party can be anyone with access to the training data or result besides customer.

Figure 5:
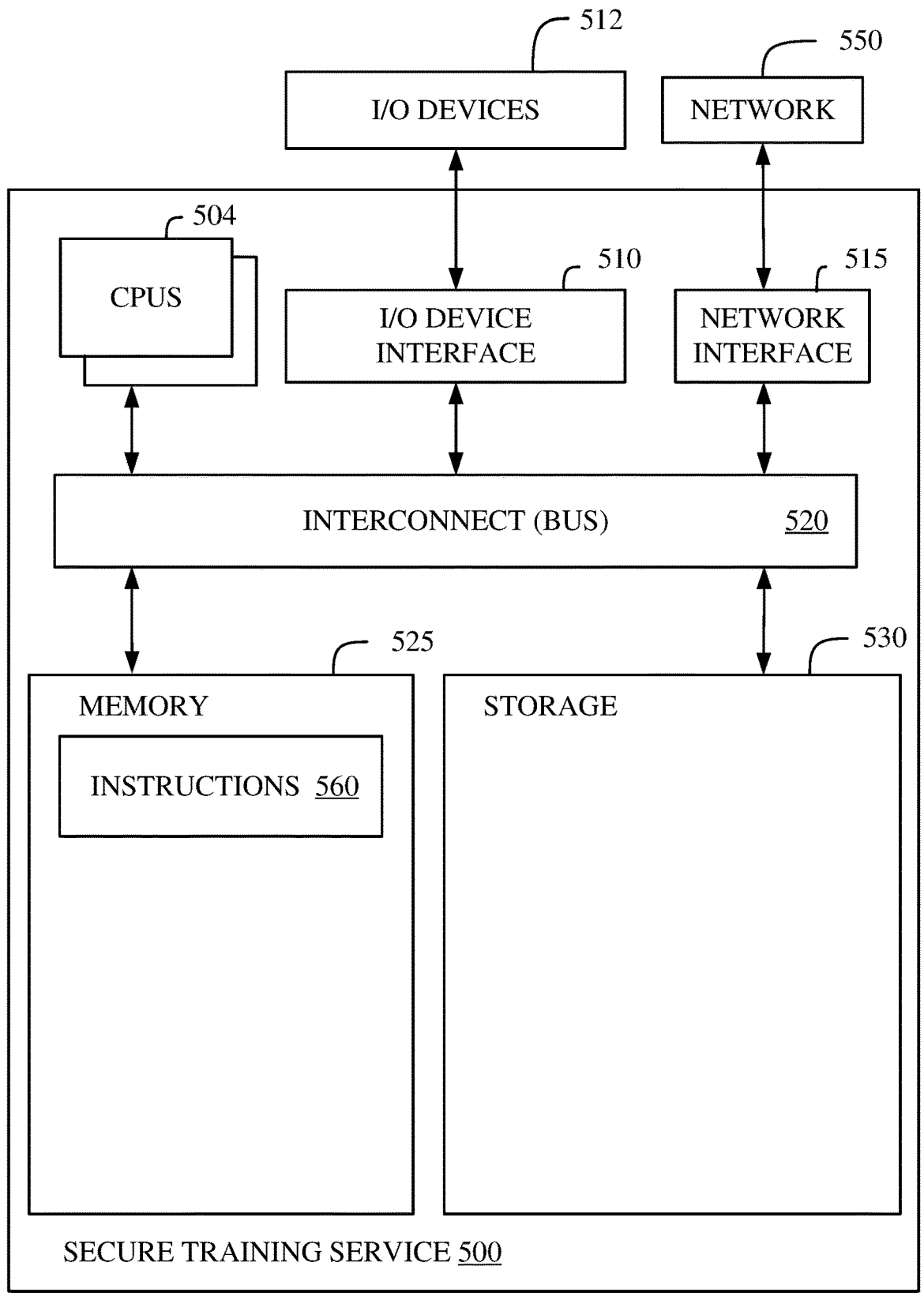
FIG. 5 is a block diagram of an example secure training service, in accordance with some embodiments of the present disclosure.

FIG. 5 is a block diagram of an example secure training service 500, in accordance with some embodiments of the present disclosure. In various embodiments, the secure training service 500 is similar to the secure training service 108 and can perform the method described in FIGS. 3-4 and/or the functionality discussed in FIGS. 1-2. In some embodiments, the secure training service 500 provides instructions for the aforementioned methods and/or functionalities to a client machine such that the client machine executes the method, or a portion of the method, based on the instructions provided by the secure training service 500. In some embodiments, the secure training service 500 comprises software executing on hardware incorporated into a plurality of devices.

The secure training service 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the secure training service 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, any of the methods described in FIGS. 3-4 and/or the functionality discussed in FIGS. 1-2.

In various embodiments, the I/O devices 512 include an interface capable of presenting information and receiving input. For example, I/O devices 512 can present information to a listener interacting with secure training service 500 and receive input from the listener.

The secure training service 500 is connected to the network 550 via the network interface 515. Network 550 can comprise a physical, wireless, cellular, or different network.

In some embodiments, the secure training service 500 can be a multi-user mainframe computer system, a single-user system, or a server computer or similar device that has little or no direct user interface but receives requests from other computer systems (clients). Further, in some embodiments, the secure training service 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary secure training service 500. In some embodiments, however, individual components can have greater or lesser complexity than as represented in FIG. 5, components other than or in addition to those shown in FIG. 5 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
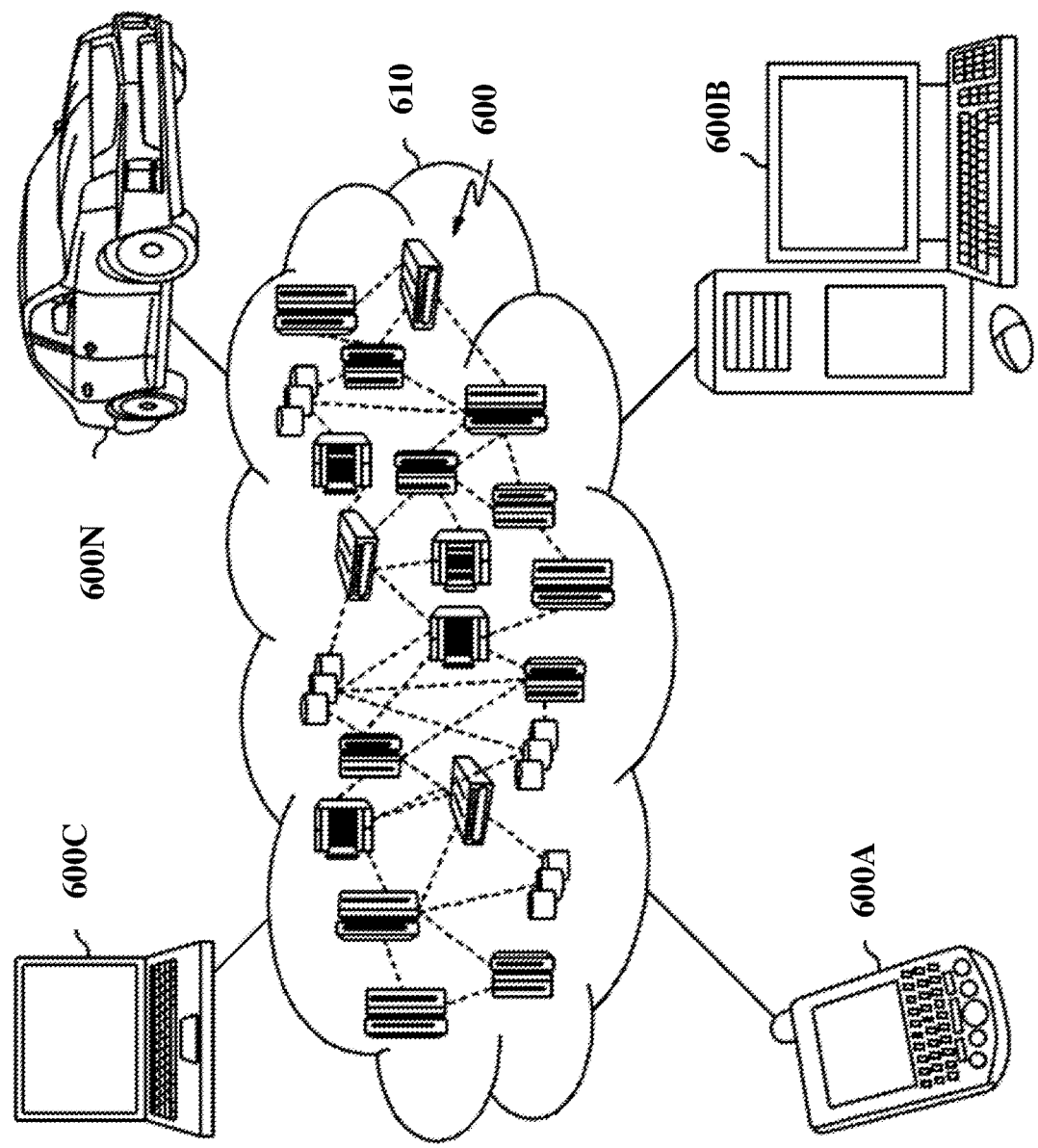
FIG. 6 is a cloud computing environment, according to some embodiments of the present disclosure.

FIG. 6 is a cloud computing environment 610, according to some embodiments of the present disclosure. As shown, cloud computing environment 610 includes one or more cloud computing nodes 600. The cloud computing nodes 600 can perform the methods described in FIGS. 3-4 and/or the functionality discussed in FIGS. 1-2. Additionally, cloud computing nodes 600 can communicate with local computing devices used by cloud consumers, such as, for example, personal digital assistant (PDA) or cellular telephone 600A, desktop computer 600B, laptop computer 600C, and/or automobile computer system 600N. Further, the cloud computing nodes 600 can communicate with one another. The cloud computing nodes 600 can also be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
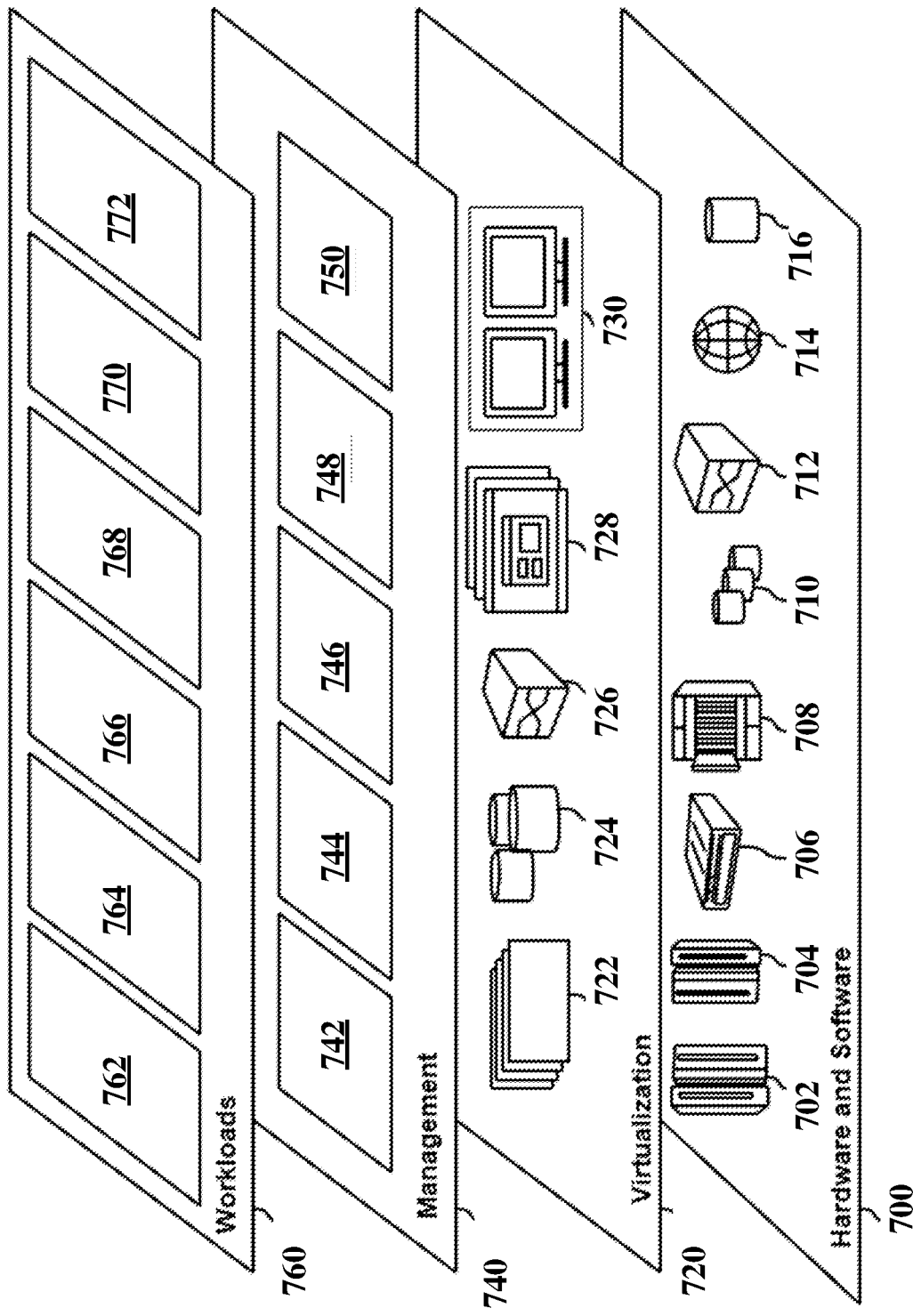
FIG. 7 is a set of functional abstraction model layers provided by cloud computing environment, according to some embodiments of the present disclosure While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

FIG. 7 is a set of functional abstraction model layers provided by cloud computing environment 610 (FIG. 6), according to some embodiments of the present disclosure. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities can be provided: virtual servers 722; virtual storage 724; virtual networks 726, including virtual private networks; virtual applications and operating systems 728; and virtual clients 730.

In one example, management layer 740 can provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service level management 748 can allocate suitable processing power and memory to process static sensor data. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment can be utilized. Examples of workloads and functions which can be provided from this layer include: mapping and navigation 762; software development and lifecycle management 764; virtual classroom education delivery 766; data analytics processing 768; transaction processing 770; and secure training service 772.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A system comprising:
one or more computer processing circuits; and
one or more computer-readable storage media storing program instructions which, when executed by the one or more computer processing circuits, are configured to cause the one or more computer processing circuits to perform a method comprising:
validating, before training a machine learning model using a deep learning network, training data that is provided for training a machine learning model using ordinary differential equations;
generating pre-processed training data from the validated training data by:
generating encrypted training data from the validated training data using homomorphic encryption; and
generating random noise based on the validated training data; and
training the machine learning model adversarially with the pre-processed training data.

2. The system of claim 1, the method further comprising generating a plurality of adversarial examples from the pre-processed training data.

3. The system of claim 1, the method further comprising providing the training as a cloud service.

4. The system of claim 1, further comprising:
a data validation layer that validates the training data;
a pre-processing layer that generates the pre-processed training data; and
a data training layer that trains the machine learning model.

5. The system of claim 1, the method further comprising:
receiving feedback for one or more predictions by the machine learning model based on a quality of service agreement for the machine learning model; and
updating the machine learning model based on the feedback.

6. The system of claim 1, wherein validating the training data comprises generating a validation report that identifies potentially poisoned training data.

7. A computer-implemented method, comprising:
validating, before training a machine learning model using a deep learning network, training data that is provided for training a machine learning model using ordinary differential equations;
generating pre-processed training data from the validated training data by:
generating encrypted training data from the validated training data using homomorphic encryption; and
generating random noise based on the validated training data; and
training the machine learning model adversarially with the pre-processed training data.

8. The method of claim 7, further comprising generating a plurality of adversarial examples from the pre-processed training data.

9. The method of claim 7, further comprising providing the training as a cloud service.

10. The method of claim 7, wherein:
a data validation layer validates the training data;
a pre-processing layer generates the pre-processed training data; and
a data training layer trains the machine learning model.

11. The method of claim 7, further comprising:
receiving feedback for one or more predictions by the machine learning model based on a quality of service agreement for the machine learning model; and
updating the machine learning model based on the feedback.

12. The method of claim 7, wherein validating the training data comprises generating a validation report that identifies potentially poisoned training data.

13. A computer program product comprising one or more computer readable storage media, and program instructions collectively stored on the one or more computer readable storage media, the program instructions comprising instructions configured to cause one or more processors to perform a method comprising:
validating, before training a machine learning model using a deep learning network, training data that is provided for training a machine learning model using ordinary differential equations;
generating pre-processed training data from the validated training data by:
generating encrypted training data from the validated training data using homomorphic encryption; and
generating random noise based on the validated training data;
generating a plurality of adversarial examples from the pre-processed training data; and
training the machine learning model adversarially with the pre-processed training data and the plurality of adversarial examples.

14. The computer program product of claim 13, the method further comprising providing the training as a cloud service.

15. The computer program product of claim 13, wherein:
a data validation layer validates the training data;
a pre-processing layer generates the pre-processed training data; and
a data training layer trains the machine learning model.

16. The computer program product of claim 13, the method further comprising:
receiving feedback for one or more predictions by the machine learning model based on a quality of service agreement for the machine learning model; and
updating the machine learning model based on the feedback.

17. The computer program product of claim 13, wherein validating the training data comprises generating a validation report that identifies potentially poisoned training data.

* * * * *